Sept. 23, 1958 E. HOFFMANN 2,852,976
OPTICAL DEVICE FOR FINE ADJUSTMENT OF MOVABLE
MACHINE PARTS, INCLUDING PHOTO-ELECTRIC
INDICATING MEANS
Filed March 16, 1954
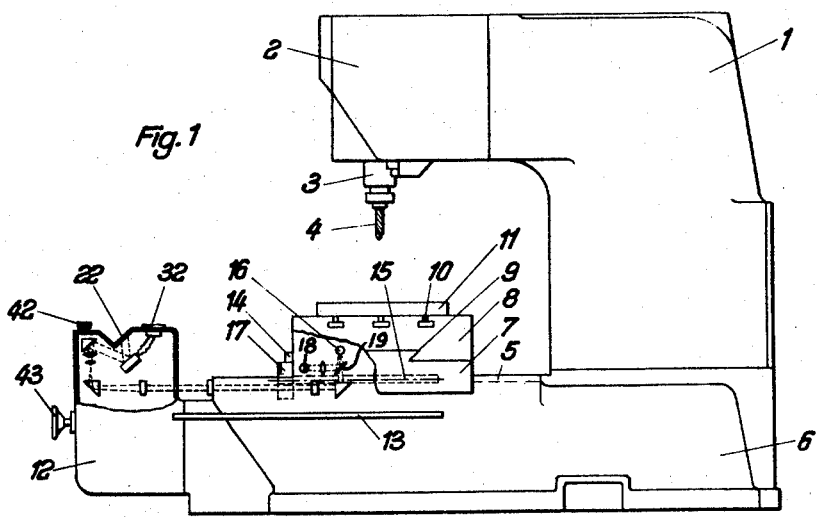
Fig. 1
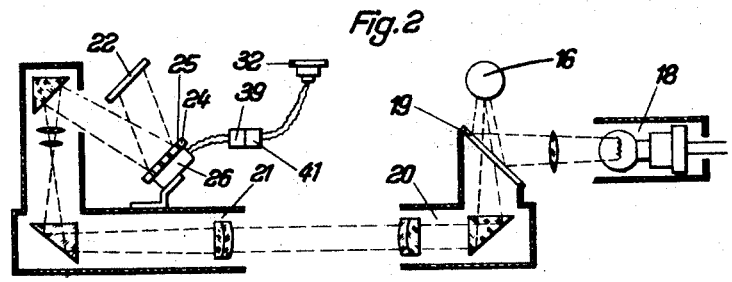
Fig. 2
  
Fig. 3     Fig. 4     Fig. 5
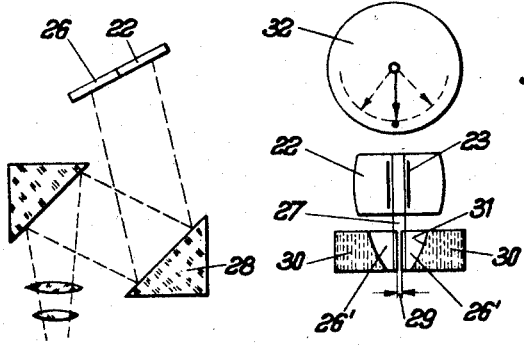 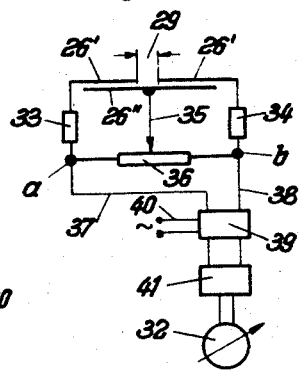
Inventor:
Erich HOFFMANN
Attorney

United States Patent Office 2,852,976
Patented Sept. 23, 1958

2,852,976

OPTICAL DEVICE FOR FINE ADJUSTMENT OF MOVABLE MACHINE PARTS, INCLUDING PHOTO-ELECTRIC INDICATING MEANS

Erich Hoffmann, Berlin-Zehlendorf, Germany, assignor to Herbert Lindner G. m. b. H., Berlin-Wittenau, Germany Application March 16, 1954, Serial No. 416,594

Claims priority, application Germany March 21, 1953

4 Claims. (Cl. 88—14)

The present invention concerns improvements in and relating to the fine adjustments of movable parts and a method of indicating an optically-magnified graduation line adjusted to an index mark provided on a mat screen and/or in the field of vision of a microscope. In a still more specified aspect, this invention relates to the fine adjustment of machine tool slides, especially those of co-ordinate boring machines.

Modern machine tools are often provided with optical measuring systems in order to increase the adjustment accuracy of the slides and, consequently, the machining accuracy of the workpiece. For this reason, jig boring machines are frequently furnished with optical measuring systems the main parts of which are precision scales whose graduation lines are ascertained by telescope and collimator. These scales, for instance, consist of cylindrical rods on the highly polished, rustproof surfaces of which the graduation is scribed as a fine helical line. The width of the line is but a few thousandths of a millimetre which is magnified by a microscope, through the ocular of which the magnified graduation line can be seen which can then be adjusted to an index mark. Each one of the top and bottom slides, moving in transverse direction to each other, is provided with such a fine scale having an optical measuring system. In order to increase the adjustment accuracy the index mark consists preferably of two parallel lines close to each other, enabling the graduation line to be adjusted with a high degree of accuracy according to the light gap testing. However, it is disadvantageous that the accuracy of this adjustment depends on the ocular perception of the observer, and that repeated adjustments are affected by signs of eyestrain. In addition, parallactic displacement also affects the accuracy of adjustment. Observation by means of the microscope has also been replaced by a device whereby the graduation line was projected upon a mat screen provided with an index mark to make direct observation possible. In this case it is disadvantageous that the accuracy of adjustment suffers from the diffusion of light caused by the more or less rough grain of the screen. This does not eliminate reading mistakes caused by physiological weariness.

A further increase of reading accuracy due to greater magnification of the optical measuring system cannot be attained, for increasing magnification also increasingly blurs the graduation line.

It is, therefore, an object of this invention to provide an improved and simplified method of reading and adjustment accuracy in order to eliminate the disadvantageous eyestrain and any parallactic displacement This method may be carried out according to the present invention by having the projected graduation line on passing the index mark bringing about and indicating current fluctuations because of light ray changes, and having fine adjustment taking place in accordance with said indicated current fluctuation. The advantage of the present invention consists in having the hitherto aimed-at further optical magnification of the reading accuracy replaced by electric magnification which not only will result in greater adjustment accuracy but also in facility of reading. The light ray changes caused by the projected magnified graduation line on passing the index line are indicated photo-electrically by the deflection of the pointer of a galvanometer. The indicating accuracy depends on the intensity of light, the sensitiveness of the photo-electric cell, the degree of amplification and the sensitivity of the galvanometer. The operator is able to adapt almost at will these magnitudes to the desired reading accuracy; this makes it possible to use a galvanometer with readily seen pointer deflection.

Optical measuring systems provided with photo-electric cells have been built. But these photo-electric cells are used for another purpose, viz., for the automatic stop of a traverse or for the calibration of precision scales; while in the present invention in connection with an electric galvanometer they are employed for increasing the reading accuracy of the hand- or power-operated traverse of a machine tool slide. As a matter of fact it is possible to use the photo-electric cell according to the present invention at the same time also for the automatic stop of a traverse.

A suitable embodiment of the present invention consists in the compensation of two photo-electrically produced current fluctuations when fine adjustment has been reached, and that adjustment is according to the value of the photo-electric currents. In this manner the sensitivity of the arrangement and the accuracy of the fine adjustment can be increased to a remarkable degree.

Another embodiment of the present invention which deals with the fine adjustment equipment for carrying out the method consists in having the projected graduation line of a precision scale affect one or several photo-electric cells, whereby the photo-electrically generated D. C. passes across a chopper, which preferably operates on line frequency, and is magnified by an amplifier connected with a galvanometer.

Another embodiment according to the present invention consists in two photo-electric cells of the same characteristics being arranged side by side at a distance less than the width of the projected graduation line, and forming part of an electrical bridge circuit. In general, the change in the light intensity upon the photo-electric cells is effected by a interposed body mounted behind said cells in order to have the projected graduation line appear dark in the otherwise bright field of vision. The consequence is that on the graduation lines passing the index mark there will be set up current fluctuations due to the differences in the light intensities which disturb the hitherto existing balance between the two photo-electric cells, thereby causing the pointer of the galvanometer to deflect. Taking for granted that photo-electric cells of the same value are being used the currents generated by both cells are of equal value only when both cells are shadowed in the same degree by said interposed body. This happens when the graduation line is exactly opposite the gap of the photo-electric cells and between the two lines of the index mark. To guarantee the same characteristics of the photo-electric cells they are made according to the present invention of a single cell the barrier layer of which is cut at a width according to the distance of both cells from each other. It is suitable to have the barrier layers of the photo-electric cells at both sides of the gap covered by a tapering interposing body. A very compact construction is possible by having one part of the projected graduation line fall upon the index mark, and the other part upon the photo-electric cell the gap of which coincides optically with the position of said index mark. The embodiment according to the invention can be mounted to optical adjustment equipments for any intended application where accurate adjustments must be made according to a liner or a circular measuring system.

The invention is illustrated by way of example in the accompanying drawings, in which:

Figure 1 is a side elevation of the co-ordinate boring machine with control box;

Figure 2 shows one of the optical systems with mat screen and galvanometer;

Figure 3 is another embodiment of part of Fig. 2;

Figure 4 shows the mat screen with the index mark and graduation lines between the photo-electric cells, and the galvanometer;

Figure 5 is a circuit diagram of the machine.

Referring now to the drawings by numerals of reference, 1 denotes the housing of the machine (Fig. 1). Secured to the housing at one end is the drill head 2 to which is mounted a bore spindle 3 carrying a tool 4, a bed 6 having longitudinal ways 5 and provided with a bottom slide 7 and an upper cross slide 8 mounted for sliding movement upon said slide 7. Slides 7 and 8 form a compound slide the transverse traverse of which is denoted by 9. The upper slide 8 is provided with T-slots 10 adapted for clamping a work 11. Secured to the bed at the front end thereof is the control box 12 wherein is contained part of the optical measuring equipment. For the coarse adjustment of the measuring table to approximately 0.5 mm., the coarse measuring scales 13 and 14 are employed, of which the former is for longitudinal adjustment and the letter for cross adjustment. The compound slide is finely adjusted by optical measurements. The main elements of the optical measurement are the fine cylindrical measuring rods 15, 16 on the surfaces of which the graduation is scribed as a fine helical line (not shown). The rods 15 and 16 are arranged in a known manner so as to include a right angle with each other and are shown in greater detail in German Patent No. 609,948 and British Patent No. 432,684 which stand in the name of the licensee of the present invention. They are adjusted by measuring drums, of which the drum for the fine measuring rod 15 is mounted at the bottom slide and shown at 17. These well-known fine measuring rods are optically read. Illumination of the measuring rod 16 is by an electric lamp 18 which projects its rays through the optical flat 19 onto the fine measuring rod 16, the graduation lines of which are projected onto a mat screen 22 by means of a collimator objective 20 and a telescopic system 21. In Fig. 1 the lamp 18 is shown to the left of the optical flat 19 whereas in Fig. 2 the lamp 18 is shown to the right of the flat 19 having an inclination opposite to that shown in Fig. 1. The mat screen 22 is provided with an index mark 23 which can also be provided as a reticle in the focal plane of a telescope ocular if the graduation on the fine scale is not projected but observed directly through a microscope. In order to turn the light rays passing through the telescope 21 a reflector 24 has been provided the surface of which is equipped with openings 25. Behind said reflector a photo-electric cell 26 is mounted which generates an electric current corresponding to the intensity of the light rays passing through said openings 25. When the projected graduation line 27 is united with the index mark 23 it affects the photo-electric cell 26, thereby causing the photo-electric current to vary. The rod 15 is associated with a similar projecting and photo-electric device (not shown).

As seen from Fig. 3 the mat screen 22 may also be mounted next to the photo-electric cell 26, provided that within the path of rays a prism 28 be placed which projects part of the graduation line 27 onto the mat screen 22, and another part onto the photo-electric cell 26. The gap of the protective strip 30 should optically agree with the position of the index mark 23. Preferably two equal photo-electric cells 26', made of one cell, are provided the barrier layer of which is cut, resulting in a gap of about 0.2 millimeter width. The two photo-electric cells 26' are partially covered on both sides of said gap 29 by protective strips 30 provided with tapering cuts 31. The width of the shown graduation line 27 in this case is about 0.6 millimeter, so that with same being accurately adjusted to the index mark 23 the two photo-electric cells 26' are shadowed to a width of about 0.2 millimeter. The indicating galvanometer is shown at 32.

Fig. 4 shows the graduation line 27 in its final position relative to the index mark 23 and the photo-electric cells 26' when the pointer of the galvanometer 32 is at zero. At the moment of the graduation line's entering or leaving the index mark the pointer is deflected, as shown by the dashes.

The wiring diagram shown in Fig. 5 represents a bridge connection. The bridge elements consist of the resistances 33, 34 and the two parts of a potentiometer 36, said parts being positioned at both sides of the center tap 35. The photo-electric cells may be considered as current generators. The supporting plate 26" is connected to the center tap 35. Points $a$ and $b$ are wire-connected to a well-known chopper relay 39 which having a frequency of 50 cycles per second is attached to the A. C.-network by conduits 40. The chopped D. C. is amplified in the thermionic amplifier 41, to which is connected the indicating galvanometer 32 which is constructed as a milliammeter.

The milliammeter is mounted on top of the control box 12. Pushbuttons 42 are provided for switching on or off, respectively, the motor-operated coarse adjustment mechanism. A handwheel 43 serves for manual adjustment; it can be changed for longitudinal or cross adjustment, respectively.

The control box 12 is symmetrically constructed and provided with two mat screens 22, each screen being furnished with an indicating galvanometer 32. For better case in reading, the mat screen and the galvanometer, forming part of the longitudinal or of the cross scale, are arranged side by side at the same angle of inclination in the plane of the index mark on top of the control box.

For fine adjustment of carriage travel it is necessary for the operator to observe the graduation line entering the field of vision of the microscope and/or its appearance upon the mat screen. Instead of the adjustment according to the light gap testing only the well noticeable pointer deflection is set, at which the accurate slide adjustment is possible.

Having now particularly described and ascertained the nature of my said invention and in what manner the same is to be performed, I declare that what I claim is:

1. A device for adjusting the relative position of two elements of a machine or the like, comprising a scale adapted for coordinative movement with one of said two elements and having an elongated graduation mark thereon, a light source for illuminating said scale, screen means having index thereon mounted on the other of said elements, optical means on said last mentioned element for projecting a magnified image of said scale and of said graduation mark upon said screen for indicating the relative position of said elements, first and second photo cells arranged in a path of said optical means for projection of said magnified image of said scale, said photo cells being arranged side by side at a distance less than the width of the projected image of said graduation mark, and means, operatively connected to said photo cells, for indicating the relative intensity of light falling upon said first and second photo cells respectively whereby the relative position of the elements may be determined.

2. A device according to claim 1, wherein said last named means is an electric measuring instrument and said device includes an electric bridge connected to said photo cells.

3. A device according to claim 1, wherein said photo cells comprise a single photo cell divided into two balanced portions and including protective strips partially covering each portion.

4. A device according to claim 1, wherein said photo cells generate electrical current in accordance with their exposure to light and including means to balance the respective current.

References Cited in the file of this patent

UNITED STATES PATENTS

| | | |
|---|---|---|
| 1,794,341 | Parkhurst | Feb. 24, 1931 |
| 2,039,231 | Lindner | Apr. 28, 1936 |
| 2,141,175 | Dawson | Dec. 27, 1938 |
| 2,401,712 | Turrettini | June 4, 1946 |
| 2,406,299 | Koulicovitch | Aug. 20, 1946 |
| 2,445,044 | Stamm et al. | July 13, 1948 |
| 2,557,219 | Flint et al. | June 19, 1951 |
| 2,628,539 | De Neegaard | Feb. 17, 1953 |
| 2,703,505 | Senn | Mar. 8, 1955 |
| 2,720,810 | Senn | Oct. 18, 1955 |

FOREIGN PATENTS

| | | |
|---|---|---|
| 684,435 | Great Britain | Oct. 25, 1950 |